United States Patent [19]
Lobb et al.

[11] Patent Number: 5,429,168
[45] Date of Patent: Jul. 4, 1995

[54] OFF-THE-ROAD PNEUMATIC TIRE WITH SPECIFIED BEAD AREA DESIGN

[75] Inventors: Jolan F. Lobb, North Canton; Michael W. Cook, Canton; Dale E. Wells, Massillon; Steven Z. Lewkowicz, South Euclid, all of Ohio

[73] Assignee: The Goodyear Tire & Rubber Company, Akron, Ohio

[21] Appl. No.: 153,726

[22] Filed: Nov. 16, 1993

[51] Int. Cl.⁶ ............... B60C 3/00; B60C 9/00; B60C 15/00; B60C 15/04
[52] U.S. Cl. ................... 152/454; 152/539; 152/540; 152/544; 152/548; 152/549; 152/555
[58] Field of Search ............ 152/539, 544, 454, 549, 152/555, 549, 548

[56] References Cited
U.S. PATENT DOCUMENTS

| | | |
|---|---|---|
| 3,703,203 | 11/1972 | Simpson . |
| 4,321,957 | 3/1982 | Hahn et al. ............ 152/544 X |
| 4,790,364 | 12/1988 | Lobb et al. . |
| 4,813,467 | 3/1989 | Hinkel et al. . |
| 5,261,474 | 11/1993 | Lobb et al. . |

FOREIGN PATENT DOCUMENTS

| | | |
|---|---|---|
| 0267139 | 5/1988 | European Pat. Off. . |
| 0356058 | 2/1990 | European Pat. Off. . |
| 0557102 | 8/1993 | European Pat. Off. . |
| 2337050 | 7/1977 | France . |
| 2306803 | 12/1990 | Japan . |
| 2087805 | 6/1982 | United Kingdom . |

OTHER PUBLICATIONS

Patent Abstracts of Japan, vol. 15, No. 89 (M-1088) 4 Mar. 1991 & JP-A-02 306-803 (Yokohama Tire & Rubber Co) Dec. 20, 1990.

*Primary Examiner*—Adrienne Johnstone
*Attorney, Agent, or Firm*—David L. King; Roger D. Emerson

[57] ABSTRACT

An improved off-the-road pneumatic tire designed to be mounted on an associated design rim having a flange portion is described. The rim flange has an axially inward surface contacting the axially outward portion of the bead area of the tire. Each bead portion has a surface contacting a radially inner portion of the rim flange. The surface and the flange initially cease contact and diverge from one another at a location in the cross-section of the tire and rim and in a region of the flange in which a line L1 tangent to the flange surface and passing through the axis forms an angle greater than 0° and less than or equal 15° to with radial line L2 passing through the point of divergence and perpendicular to the axis. The tire has a steel reinforced radial ply which extends between and wraps about each bead. The ply has an inflection point located radially between a radially outward surface of the bead and a radially outward surface of the rim flange portion.

9 Claims, 9 Drawing Sheets

OFF-THE-ROAD PNEUMATIC TIRE WITH SPECIFIED BEAD AREA DESIGN

BACKGROUND OF THE INVENTION

1. Field of Invention

This invention relates to off-the-road large pneumatic tires, such as are commonly used on earthmoving equipment, and more particularly to large pneumatic tires having a specified clearance relationship between the lower bead area of the tire and a flange portion of an associated rim upon which the tire is designed to be mounted.

2. Description of the Related Art

Large pneumatic tires to be used on earthmoving equipment, commonly known as earthmover tires, are well-known. Earthmover tires are required to perform in difficult environments. When used "off-the-road", they are required to provide excellent traction for extremely heavy vehicles pushing, pulling and lifting extremely heavy loads. The environment is also fraught with rocks and other sharp instruments which can damage the tires. Due to the relatively high cost of these large tires, durability and long life is a primary design parameter.

A second environment in which the tires might be expected to form is that of public highways. Sometimes the earthmoving equipment must travel on public highways as the vehicles travel from construction site to construction site.

Previously, the required strength was built into such tires through the incorporation of certain curves into the molded shape of the exterior of the tire. These extra curves or bulges were believed to give extra support to those areas of the tire where durability was especially important, such as the lower sidewall, mid sidewall and tread center. In the bead flange area, the prior art off-the-road tires employed an interference fit whereby the tire was in contact along the radially outer surface of the rim flange. Off-the-road tire engineers conventionally add mass to structurally improve the durability of the tire.

In the aircraft tire art, tire engineers must always look to reduced mass, due to the unique weight limitations of that art's area, yet the tires must still be durable.

In U.S. Pat. Nos. 4,790,364 and 4,813,467, an aircraft tire and rim combination is disclosed which shows a clearance between a rim flange and the surface of the bead portion of the tire. However, these inventions concern aircraft tires which are much different in construction and application than earthmover tires. They are also designed to be used on aircraft rims, such as H-type rims, which are different in design than earthmover or off-the-road rims. In addition, the tires shown in U.S. Pat. Nos. 4,790,364 and 4,813,467 do not have inflection points in the ply, as does the present invention.

The present invention also has as one of its objects improved durability in the earthmover tire, but does so by providing a bead area design which has demonstrated a marked improvement over the prior art.

It is therefore an object of the invention to provide an earthmover tire having improved durability.

It is another object of the invention to provide an earthmover tire having a bead portion which cooperates with a flange portion of an associated rim to improve the durability of the tire.

It is a further object of the invention to provide an earthmover tire having a certain relationship between the bead flange area of the tire and the rim flange, such relationship creating a clearance therebetween. The nature of the clearance is discussed herein and meets certain requirements in order to provide the durability sought.

SUMMARY OF THE INVENTION

An improved off-the-road pneumatic tire is disclosed. The improved pneumatic tire has a nominal rim diameter of at least 50 centimeters (20 inches), an axis of rotation, and a carcass having a pair of bead portions. Each bead portion has an annular inextensible bead and a bead portion. The carcass further includes a steel-reinforced radial ply extending between and wrapped around each bead. The ply has turn-up ends extending axially and radially outwardly from each bead and a plurality of reinforcing belts disposed radially outwardly of the ply. A tread is disposed radially outwardly of the carcass. Each bead portion has a radially inner first surface and a radially outwardly extending second surface. The first and second surfaces of the bead portion being designed to engage a design rim as specified by the applicable standards organization. The rim having a pair of bead seat portions and a pair of flange portions respectively. Each bead portion has the first surface contacting the bead seat portion of the rim and the radially outwardly extending second surface contacting a radially inner portion of the rim flange portion. When the tire is mounted onto the rim, uninflated and unloaded, the second surface and the flange initially cease contact and diverge from one another at a location in the cross-section of the tire and rim and in a region of the flange in which a line L1 tangent to the flange surface and passing through the axis forms an angle greater than 0° an less than or equal to 15° with a radial line L2 passing through the point of divergence and perpendicular to the axis.

In a preferred embodiment, the line L1 forms an angle in the range of greater than 2° and equal to or less than 15° with the radial line L2.

According to another aspect of the invention, the tire is further characterized by the ply having an inflection point, the inflection point radially being between a radially outer surface of the bead and a radially outer surface of the flange portion of the rim.

According to another aspect of the invention, the second surface of the bead flange is defined by a radius R1 and the radially inner portion of the rim flange portion is defined by a radius R2, R1 and R2 having centers along a line parallel to the axial centerline of the tire, R1 being greater than R2 and being equal to or less than 1.3 R2.

According to another embodiment of the invention, the tire has a thickness T1 of rubber axially and radially inwardly of the ply. The thickness T1 is 1.5% and 3.5% of the tire's section width. The insert has a thickness which is between 50% and 75% of T1 inwardly of the ply.

Still other benefits of the invention will become apparent to those skilled in the art upon a reading and understanding of the following detailed description of the invention.

DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DEFINITIONS

Figure 1:
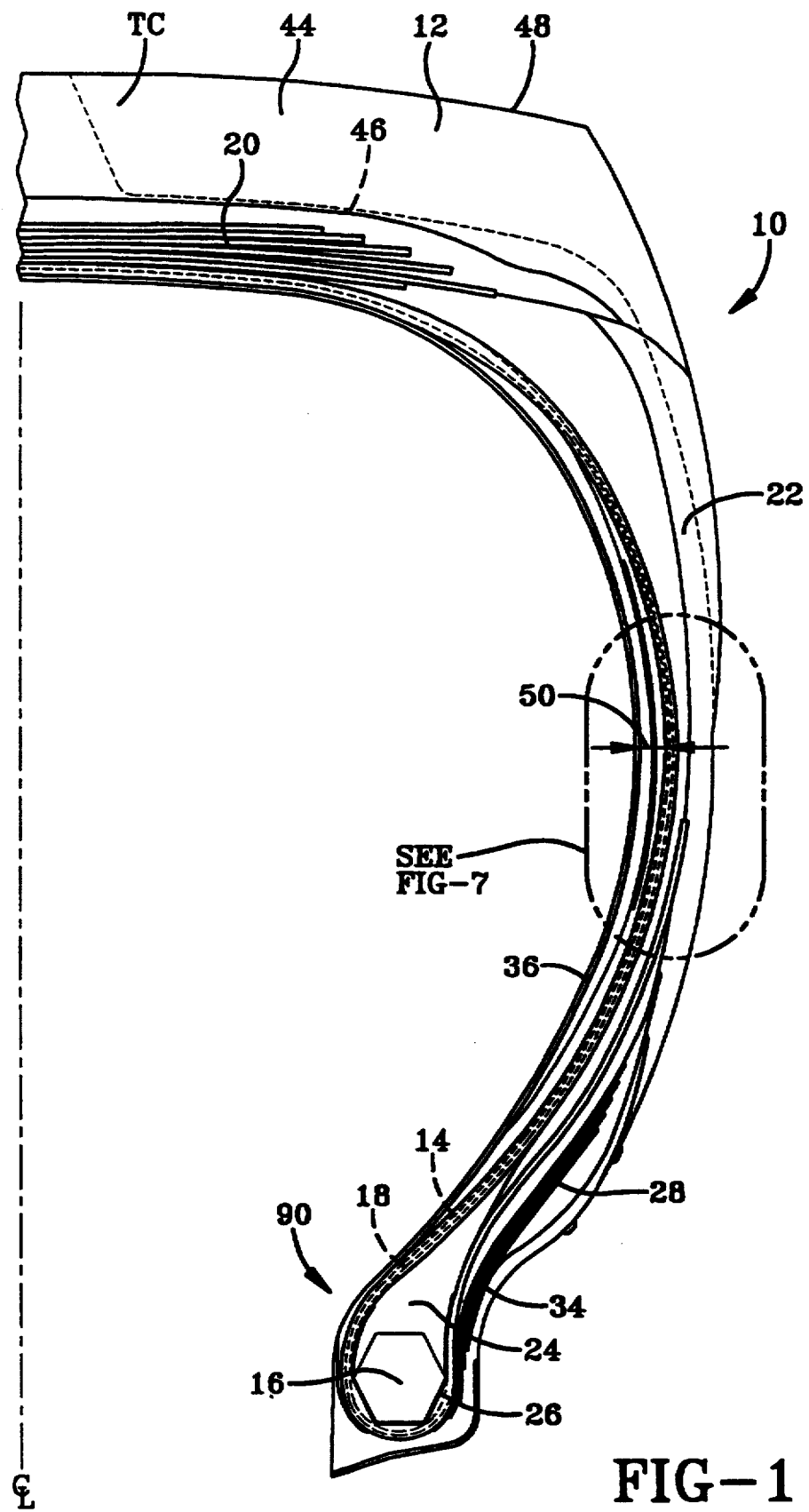
FIG. 1 is a cross-sectional view illustrating one side or one half of symmetrical earthmover tire according to the invention.

"Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Carcass" means the tire structure apart from the belt structure, tread, under tread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" means a reinforcement structure located in the bead portion of the tire;

"Cord" means one of the reinforcement strands of which the plies in the tire are comprised;

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organisation—Standards Manual and the term design rim means the same as the standard measurement rims. In Japan, the standard organization is The Japan Automobile Tire Manufacturer's Association.

"Equatorial plane (EP)" means the plane perpendicular to the tire's axis of rotation and passing through the center of its tread;

"Footprint" means the contact patch or area of contact of the tire tread with a flat surface at zero speed and under normal load and pressure;

"Innerliner" means the layer or layers of elastomer or other material that form the inside surface of a tubeless tire and that contain the inflating fluid within the tire;

"Net-to-gross ratio" means the ratio of the tire tread rubber that makes contact with the road surface while in the footprint, divided by the area of the tread in the footprint, including non-contacting portions such as grooves;

"Normal rim diameter" means the average diameter of the rim flange at the location where the bead portion of the tire seats;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" means directions radially toward or away from the axis of rotation of the tire;

"Radial-ply tire" means belted or circumferentially-restricted pneumatic tire in which the ply cords which extend from the bead to bead are laid at cord angles between 65 degrees and 90 degrees with respect to the equatorial plane of the tire;

"Section height" (SH) means the radial distance from the nominal rim diameter to the outer diameter of the tire at its equatorial plane; and, "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

DETAILED DESCRIPTION OF THE INVENTION

Figure 2:
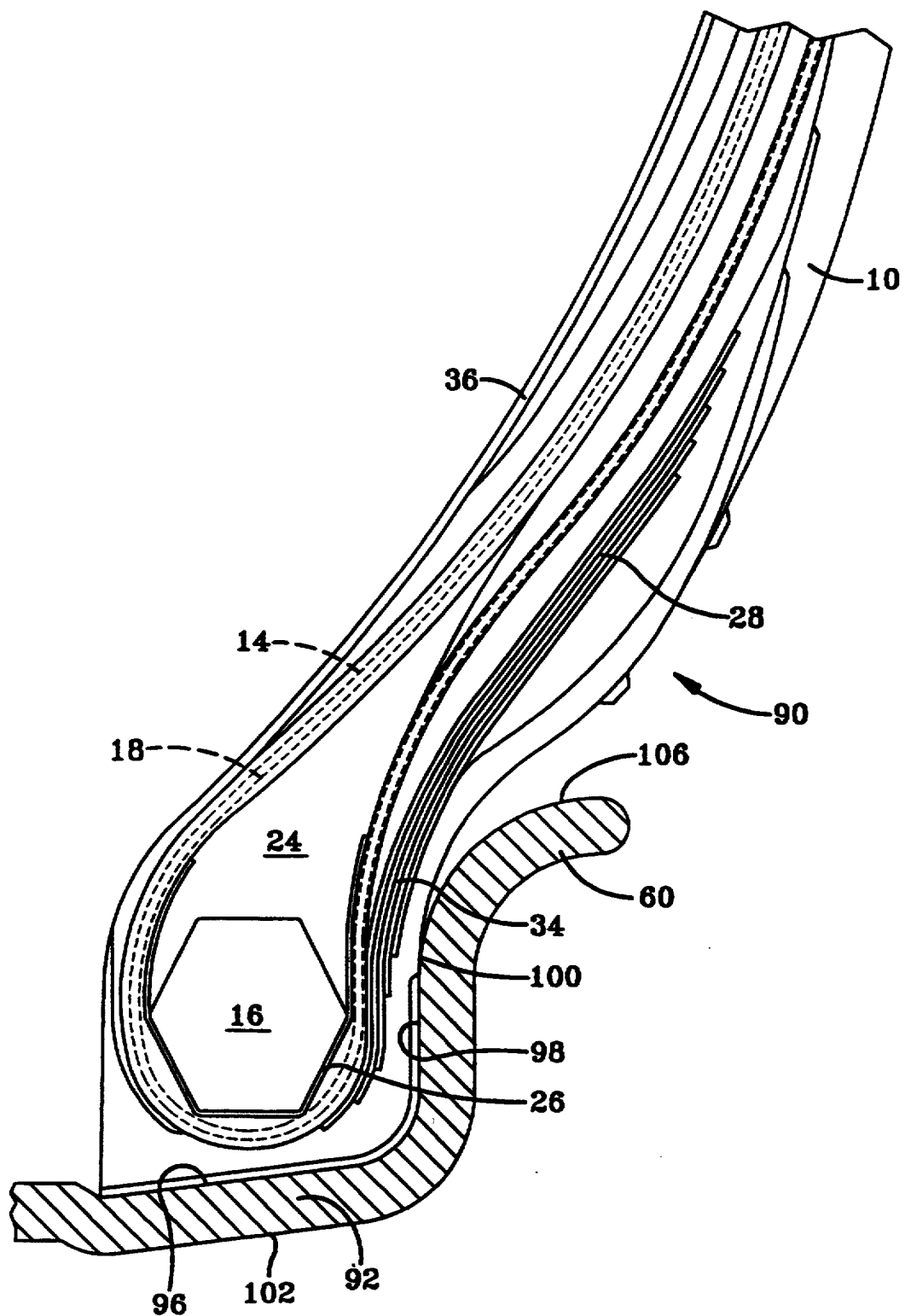
FIG. 2 is an enlarged cross-sectional view illustrating the bead portion of the tire of FIG. 1.

With reference to FIGS. 1 and 2, a cross-sectional view of one half of earthmover tire 10 according to the invention is illustrated.

The tire 10 has a tread 12 disposed over the crown region of the tire carcass 14. The carcass 14 has a pair of inextensible annular beads 16. The illustrated beads 16 are of hexagonal cross-sectional shape, although alternate bead designs will also be disclosed herein. Wrapped about the beads 16 is a steel cord reinforced ply 18. Disposed radially outwardly of the ply 18 is a steel reinforced belt package 20 consisting of at least four belts. A pair of sidewalls 22 extend between the tread 12 and the bead area. Above the bead 16 is an elastomeric apex 24. Wrapped around the bead is a flipper 26. The flipper 26 is adjacent the bead 16 and the carcass ply 18. Outward of the ply turn-up 28 are cord reinforced chippers 30. The radially inner portion of the carcass 14 includes an air impermeable inner liner 36. Adjacent the inner liner 36 is an elastomeric ply line insert 50.

The tire 10 has a flat tread arc at the centerline (CL) of the tread 12 in the area marked TC. The tread 12 includes a plurality of radially outer ground-contacting lugs 44 and an inner tread 46.

In the preferred embodiment, the ground-contacting lugs 44 have a radially outer ground contacting surface 48 having an area in the range of 40% to 60% of the overall tread area. This relationship of the ground-contacting area of the tread to the other portions of the tread is commonly referred to as the "net-to-gross ratio."

Figure 11:
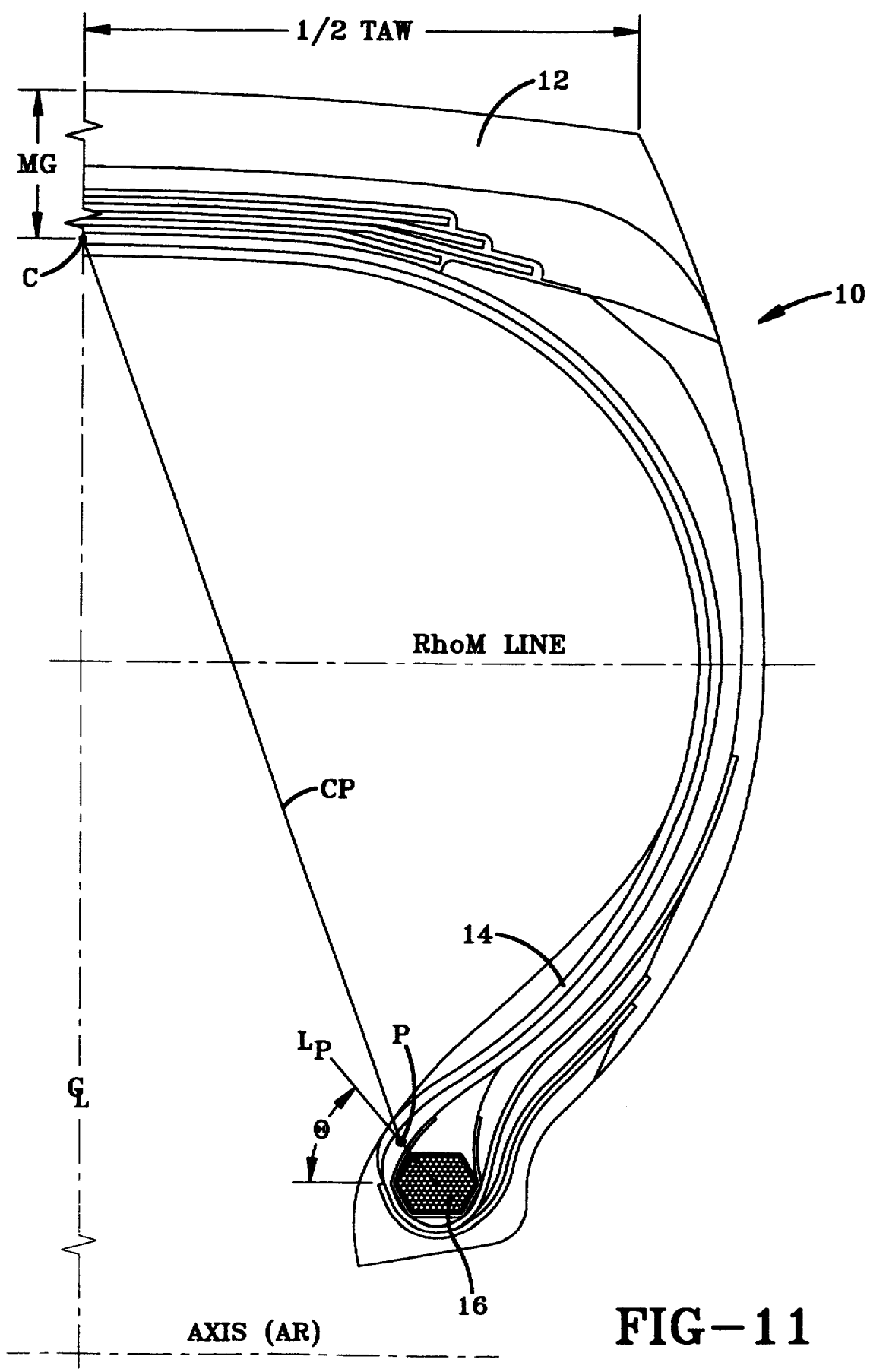

With reference to FIG. 11, certain standard tire parameters will be defined with reference to an off-the-road tire 10. The carcass 14 has the steel cord reinforced ply oriented along a path commonly known as the "ply line." As illustrated in FIG. 11, the ply line is located at the minimum centerline gauge at the tire centerline. From this data, the RhoM line can be determined. The actual radii and tangency points are defined geometrically from specific tire envelope and construction perimeters. The design requires the following data prior to defining the geometry: Bead size, tread line centerline depth required engages of all components at the tread centerline. The maximum section width (SW) and outside diameter (OD) are determined, as is the tire bead size and dimensions, according to conventional methods. Then RhoM is defined by finding the center point between the ply line bead pivot point (45 degrees) from the bead center at the ply line centerline and the ply line centerline at the tire radial centerline. To calculate RhoM, one must first locate two points on the tire: the ply line pivot point (P) and ply line centerpoint (C). The ply line pivot point is located at the intersection of the ply line centerline and a line (Lp) drawn at an angle A of 45 degrees relative to the axis of rotation and extending from the bead center.

The ply line centerpoint (C) is located at the ply line centerline at cross-sectional centerline (CL). In the preferred embodiment, this point is located at the cross-sectional centerline (CL) at the minimum gauge (MG) to the top of the reinforcing ply plus one half of the ply gauge. The minimum gauge (MG) is determined for a given tire by summing the following: 1) desired tread depths; 2) required under tread gauge; 3) reinforcing belt gauges; 4) any insulating gum layers between the above components; and 5) one half of the thickness of the ply 18.

A line extending between these points defines the line (PC). At the midpoint of the PC line, parallel to the axis of rotation of the tire is the RhoM line. The distance from the tire's axis of rotation (AR) and the RhoM line is RhoM (or the midline radius). The description of the ply line and other tire geometry parameters are discussed in more detail in copending US Patent Application serial number 07/999,255, now U.S. Pat. No. 5,261,474, which is incorporated herein by reference.

Figure 3:
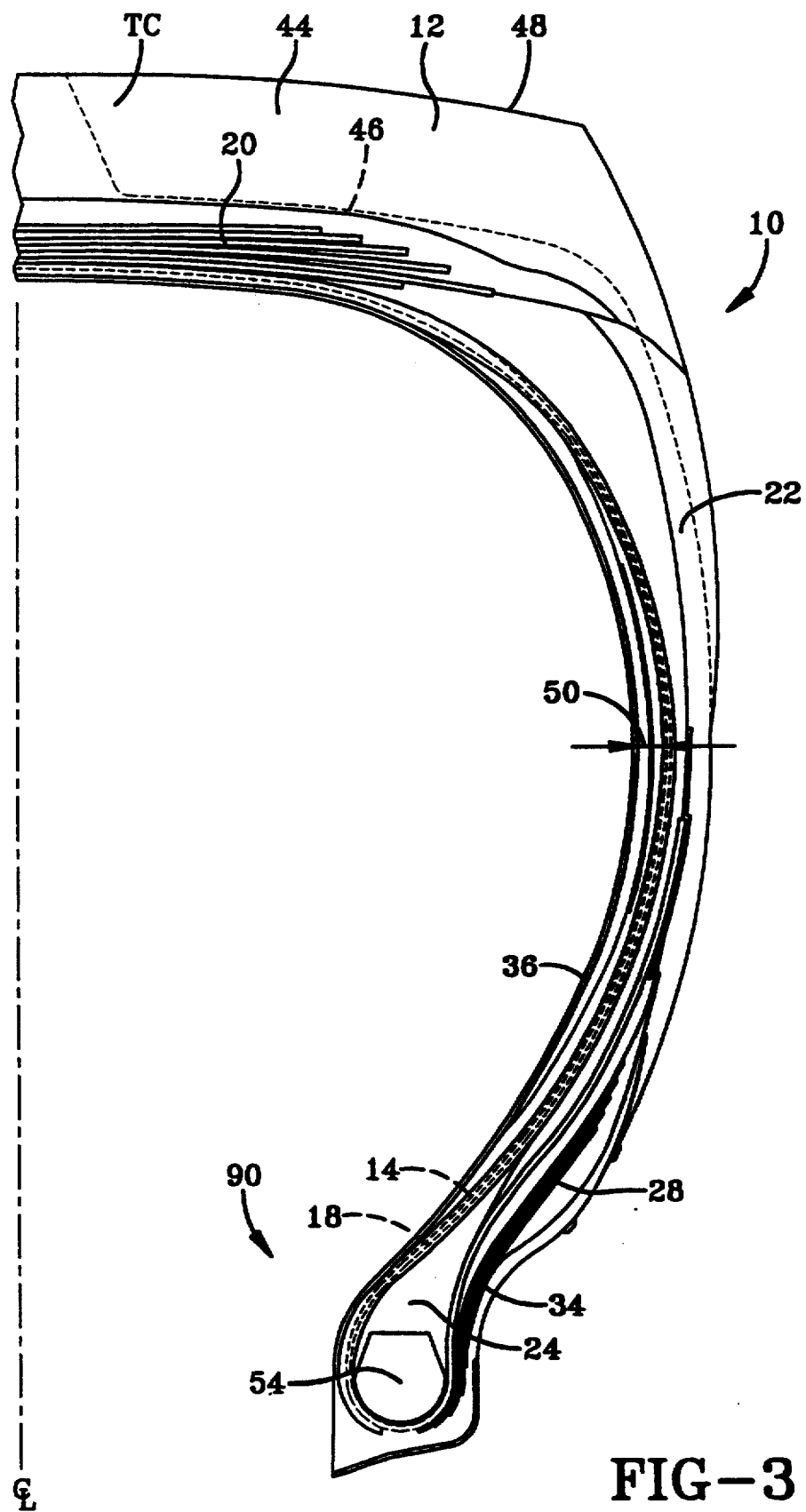
FIG. 3 is a cross-sectional view of the bead portion of a tire according to a second embodiment of the invention.
Figure 4:
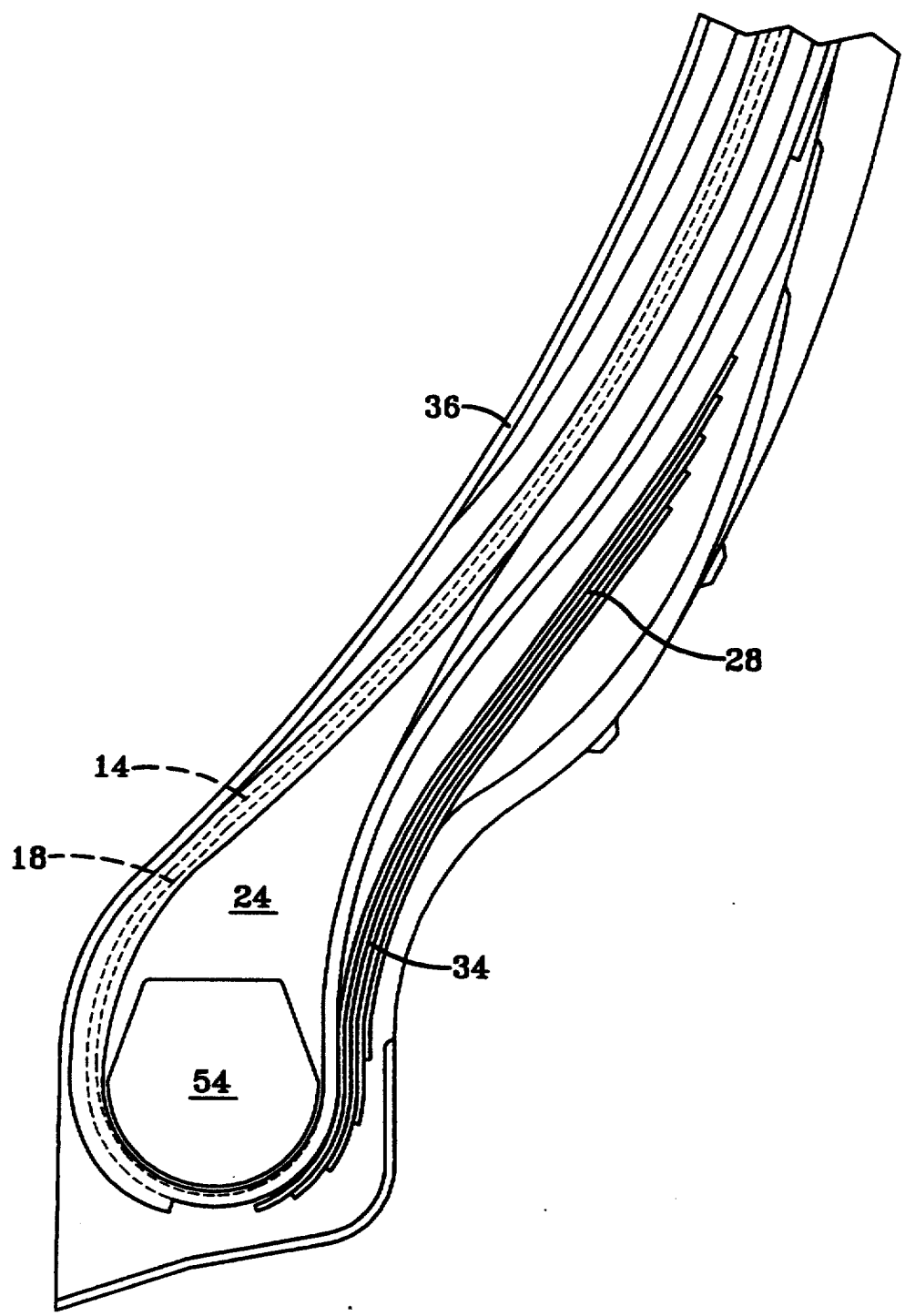
FIG. 4 is an enlarged cross-sectional view of the tire shown in FIG. 3.

With reference to FIGS. 3 and 4, an alternate embodiment of the invention is disclosed. All components of the invention are the same as that disclosed in FIGS. 1 and 2 with the exception of the bead 16. In the embodiment shown in FIGS. 3 and 4, the radially outer half of the bead 54 has a hexagonal configuration while the radially inner half of the bead 54 is approximately semicircular.

Figure 9:
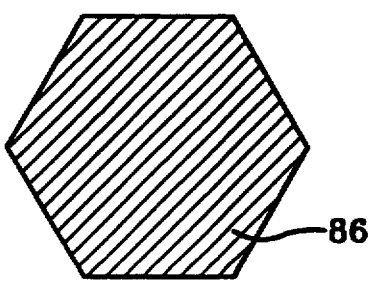
FIG. 9 is a cross-sectional view of a typical bead as used in earthmover tires.
Figure 10:
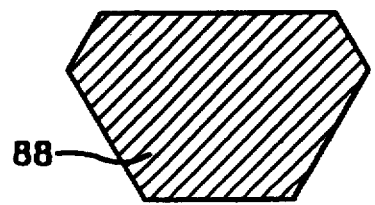
FIG. 10 is a cross-sectional view of a bead as used in a second embodiment of earthmover tires according to the invention; and, FIG. 11 is a cross-sectional view of one-half of a symmetrical earthmover tire according to the invention, shown to illustrate various tire parameters.

With reference to FIGS. 9 and 10, a third embodiment of a bead is illustrated. In FIG. 9, a bead 86 as is used in the improved tire is compared to a bead 88 which is used in some embodiment of the improved tire. Bead 86 has a height of 2.52 inches while bead 88 has a height of only 1.77 inches, approximately 70% the height of bead 86.

Figure 5:
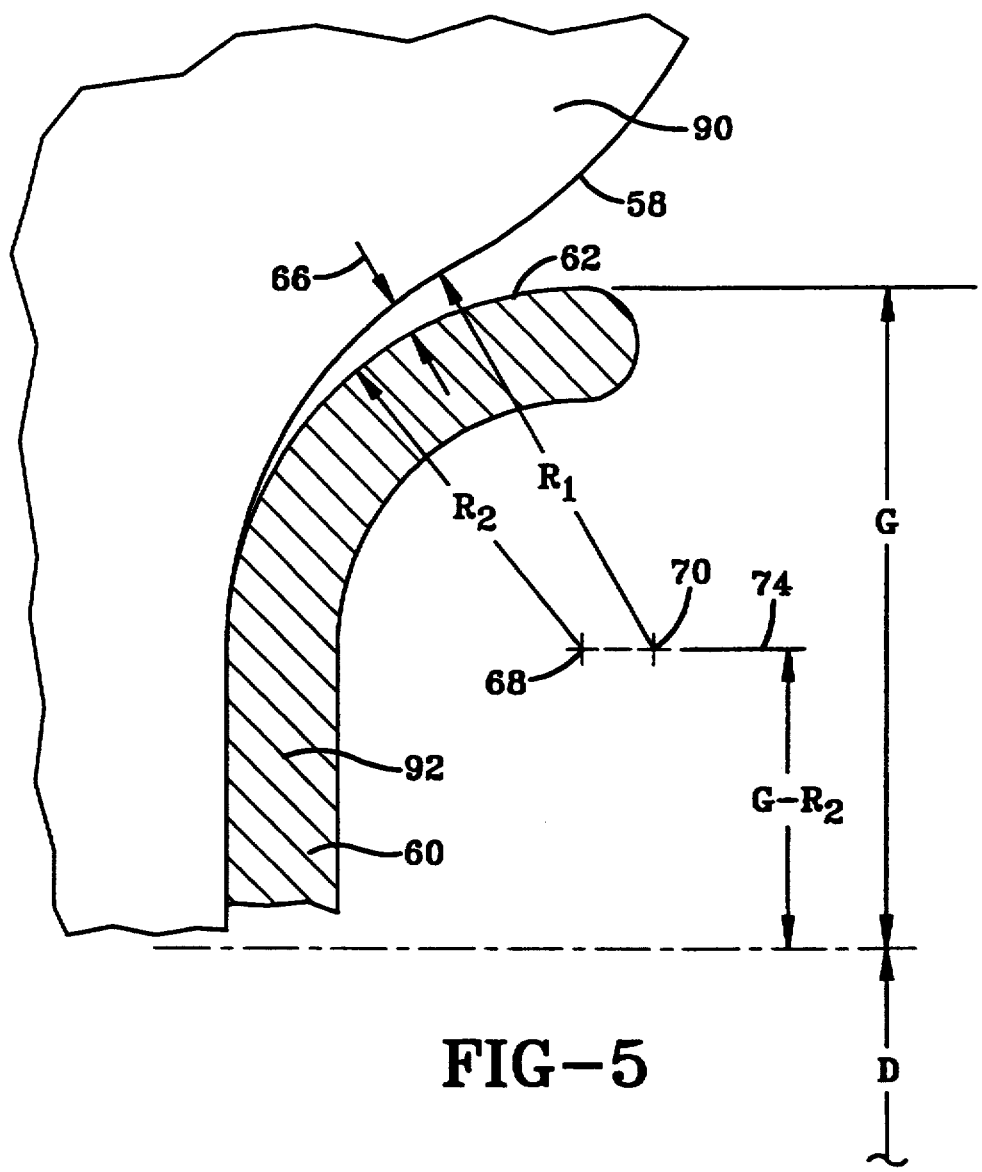
FIG. 5 is a schematic view of the geometric relationship between an axially outward portion of the bead portion of the tire and the flange portion of the rim.

With reference to FIG. 5, another important aspect of the invention will be explained. In FIG. 5, the radially and axially outer surface 58 of a bead portion 90 of a tire 10 near its interface with a flange portion 60 of a rim 92 is schematically shown. The flange portion 60 has a radially and axially inner portion 62 which contacts the outer surface 58 of the bead portion 90 of the tire 10. In the improved tire 10, a clearance 66 is created by a relationship between R1, which is the radius of the outer surface 58 of the bead portion 90, and R2, which is the radius of the flange portion 60 of the rim 92. According to the invention, R1 is equal to or greater than 1.3 R2. The center 68 of R2 and the center 70 of R1 are located along a line 74 which is parallel to the tire's axis of rotation. The line 74 is equal to G minus R2, and is a standard in the industry as defined by the 1993 Tire and Rim Association handbook. In the preferred tire 10, a 36.00R51 earthmover tire, the clearance 66 so created is between 0.08 inches and 0.12 inches, with the preferred clearance 66 being 0.10 inches.

Figure 6:
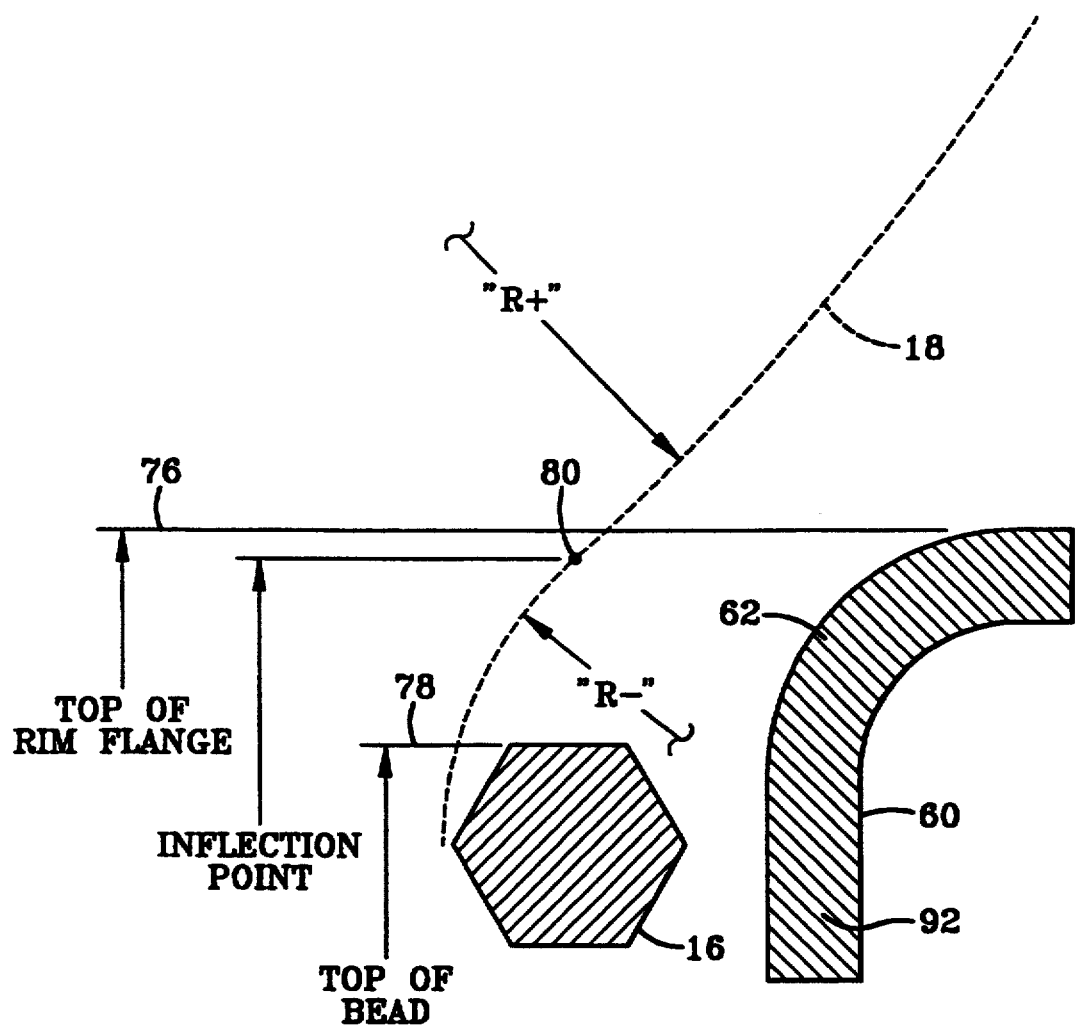
FIG. 6 is a schematic view of an inflection point in the ply line of an earthmover tire according to the invention.
Figure 7:
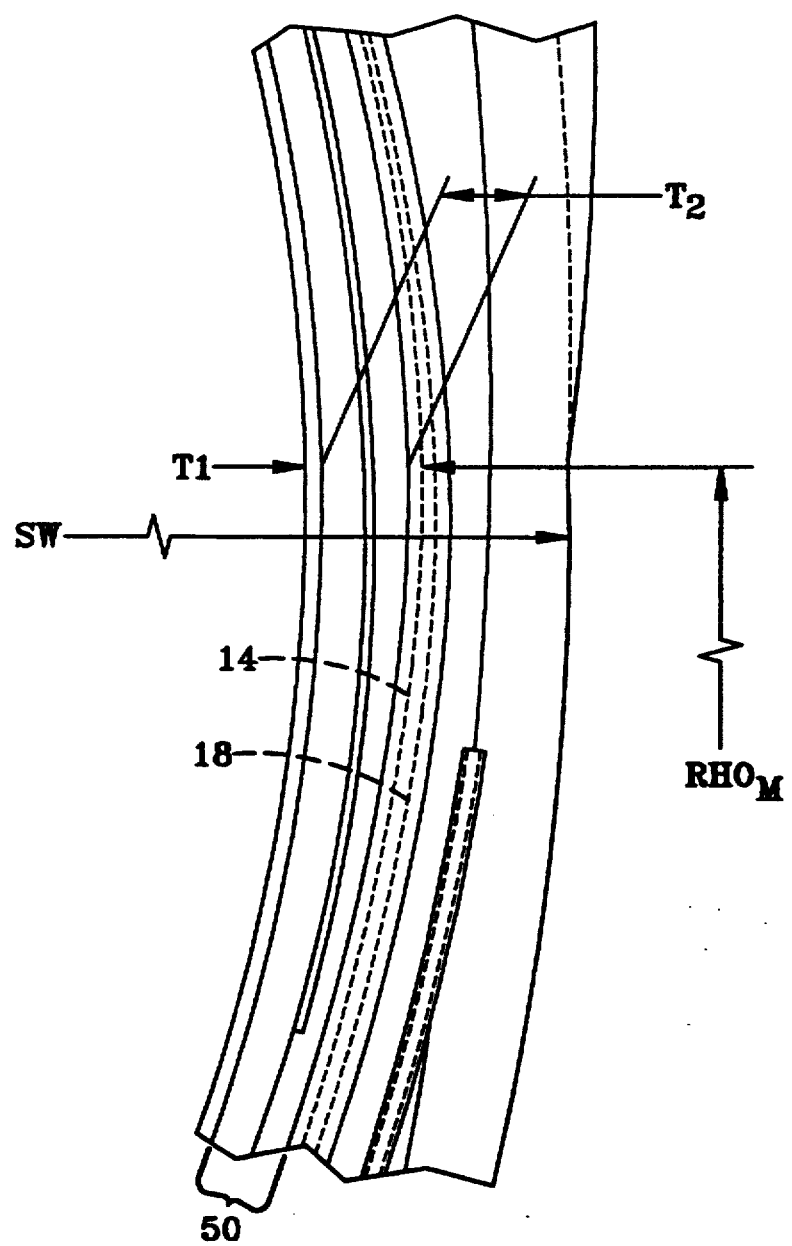
FIG. 7 is a schematic view of a tire sidewall according to the invention.
Figure 8:
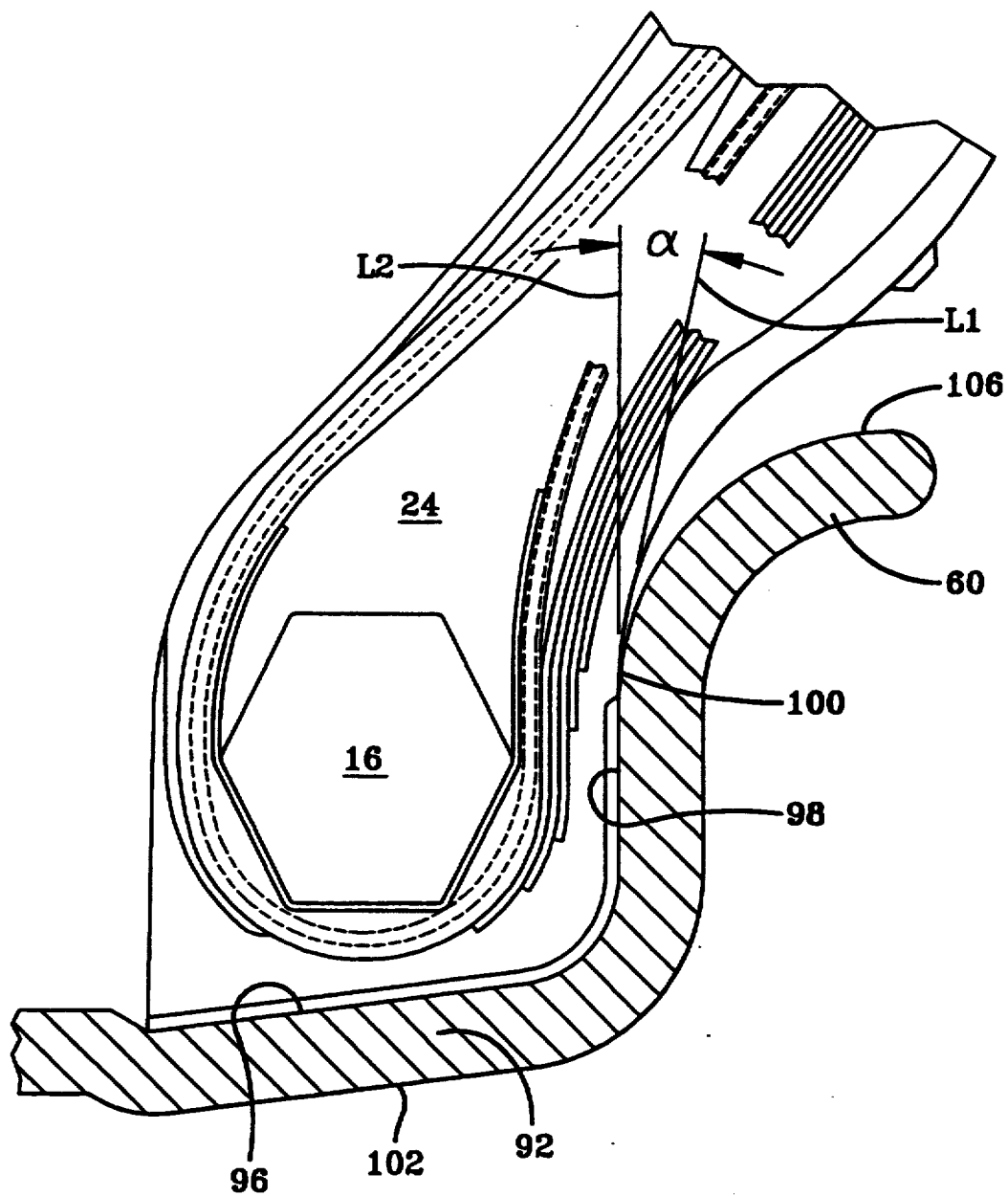
FIG. 8 is a schematic view of a further geometric relationship between the bead portion of the tire and the flange portion of the rim.

With reference to FIG. 6, a further aspect of the invention will be illustrated. In FIG. 6, the bead 16, flange portion 60 of the rim 92 and ply 18 are schematically illustrated. The radially outermost surface of flange portion 60 is indicated by line 76. Line 78 represents the radially outermost surface of the bead 16. An inflection point 80 in the line of the ply 18 indicates the point where the inflection of the curved ply 18 changes. The portions of the ply 18 radially outwardly of the inflection point 80 are described by a radius R+ having its center axially and radially within the tire 10. Points on the ply 18 radially inwardly of inflection point 80 are described by radius R— which has its center axially and radially outwardly of the ply 18. In the improved tire 10, the inflection point 80 is located along the ply 18 radially outwardly of the radially outermost portion of the bead 16, i.e. line 78 and radially inwardly of the radially outermost portion of the flange portion 60, i.e. line 76.

with reference to FIG. 7, a still further aspect of the invention will be illustrated. FIG. 7 is a schematic illustration of an enlarged portion of a tire near its RhoM. The portion of the tire 10 shown in FIG. 7 is essentially the area shown on FIG. 1 between lines 7—7. The insert 50 has a thickness T1 of material axially and radially inwardly of the ply 18. The thickness T1 is between 1.5% and 3.5% of the tire's section width (SW). The insert 50 has a thickness T2 which is between 50% and 75% of T1. With reference to FIGS. 2 and 8, a still further aspect of the invention will be illustrated. The bead portion 90 of the tire 10 has a radially inner first surface 96 and a radially outwardly extending second surface 98. The first and second surfaces 96,98 of the bead portion 90 are designed to engage a design rim 92 as specified by the applicable standards organization. Currently, such a standards organization is the Tire & Rim Association. The rim 92 includes a pair of bead seat portions 102 and a pair of flange portions 60 respectively. The improved tire 10, when normally mounted uninflated and unloaded, is characterized by each bead portion 90 having the first surface 96 contacting the bead seat portion 102 of the rim and the radially outwardly extending second surface 98 contacting a radially inner portion 106 of the rim flange portion 60. The second surface 98 of the bead portion 90 and the flange 60 initially ceasing contact and diverging from one another at a location in the cross-section of the tire 10 and rim 92 and in a region of the flange 60 in which a line L1 tangent to the flange surface 106 and passing through the axis of the tire 10 forms an angle greater than 0° and less than or equal to 15° with a radial line L2 passing through the point of divergence 110 and perpendicular to the axis of the tire 10. The line L1 forms an angle $\alpha$ in the range of greater than 0° and equal to or less than 15° with the radial line L2. In a preferred embodiment, the line L1 forms an angle in the range of greater than 2° and equal to or less than 15° with the radial line L2.

Tires incorporating the above-described features have proven to be more durable than prior art designs. For example, tires incorporating the inventive features described herein demonstrated a 51.3% improvement in lower sidewall cyclic distortion energy density measurements (DEDs). These energy measurements are a accurate indicator of strain energy density in tire designs. It was found that the reduced interference with the rim flange was the largest contributor to this improvement.

Sidewall surface strains were reduced from 13.2% in the control construction tire to 11.8% in the tire incorporating the inventive features. The reduction in sidewall strains was directly attributable to the presence of the inserts 50. When the inserts were removed from the experimental tires, the sidewall surface strains increased up to 13.1%, essentially identical to the 13.2% sidewall surface strains found in the control tire construction.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An improved off-the-road pneumatic tire, the tire having a nominal rim diameter of at least 50 cm (20 inches), an axis of rotation, a carcass having a pair of bead portions, each bead portion having one annular inextensible bead, the carcass further including a steel-reinforced radial ply extending between and wrapped about each bead, the ply having turn-up ends extending axially and radially outwardly from each bead; a plurality of reinforcing belts disposed radially outwardly of the ply; a tread disposed radially outwardly of the carcass; the bead portion having a radially inner first surface and a radially outwardly extending second surface, the first and second surfaces of the bead portion being designed to engage a design rim as specified by the applicable standards organization, the rim having a pair of bead seat portions and a pair of flange portions respectively; the improved tire when normally mounted on the rim, uninflated and unloaded, being characterized by:

each bead portion having the first surface contacting the bead seat portion of the rim, the radially outwardly extending second surface contacting a radially inner portion of the rim flange portion, the second surface and the flange initially ceasing contact and diverging from one another at a location 100 in the cross-section of the tire and rim and in a region of the flange in which a line L1 tangent to the flange surface and passing through the axis forms an angle greater than 0° and less than or equal to 15° with a radical line L2 passing through the point of divergence and perpendicular to the axis.

2. The pneumatic tire of claim 1 wherein the line L1 forms an angle in the range of greater than 2° and equal to or less than 15° with the radial line L2.

3. The pneumatic tire of claim 1 wherein the second surface of the bead portion is defined by a radius R1 and the radially inner portion of the rim flange portion is defined by a radius R2, R1 and R2 having centers along a line parallel to the axial centerline of the tire, R1 being greater than R2 and being equal to or less than 1.3 R2.

4. The pneumatic tire of claim 1 wherein the ply has an inflection point, the inflection point being radially between a radially outward surface of the bead and a radially outward surface of the rim flange portion.

5. The pneumatic tire of claim 1 wherein the tire has a thickness T1 of rubber axially and radially inwardly of the ply, the thickness T1 being between 1.5% and 3.5% of the tire's section width, the tire further comprising and insert axially and radially inwardly of the ply, the insert comprising a portion of the rubber having a thickness T1, the insert having a thickness T2, wherein T2 is between 50% and 75% of T1.

6. The pneumatic tire of claim 1 wherein a width of the bead is between 60% and 67% of an overall width of the bead portion when measured at an axial centerline of the bead.

7. The pneumatic tire of claim 6 wherein a height of the bead is between 65% and 100% of the width of the bead.

8. The pneumatic tire of claim 6 wherein the height of the bead is between 65% and 75% of the width of the bead.

9. The pneumatic tire of claim 1 wherein the bead has a cross-section wherein a radially outer half of the cross-section of the bead is one half of a hexagon while a radially inner half of the cross-section of the bead is one half of a circle.

* * * * *